(No Model.) 2 Sheets—Sheet 2.
W. SCORER.
PHOTOGRAPHIC CAMERA.
No. 476,562. Patented June 7, 1892.
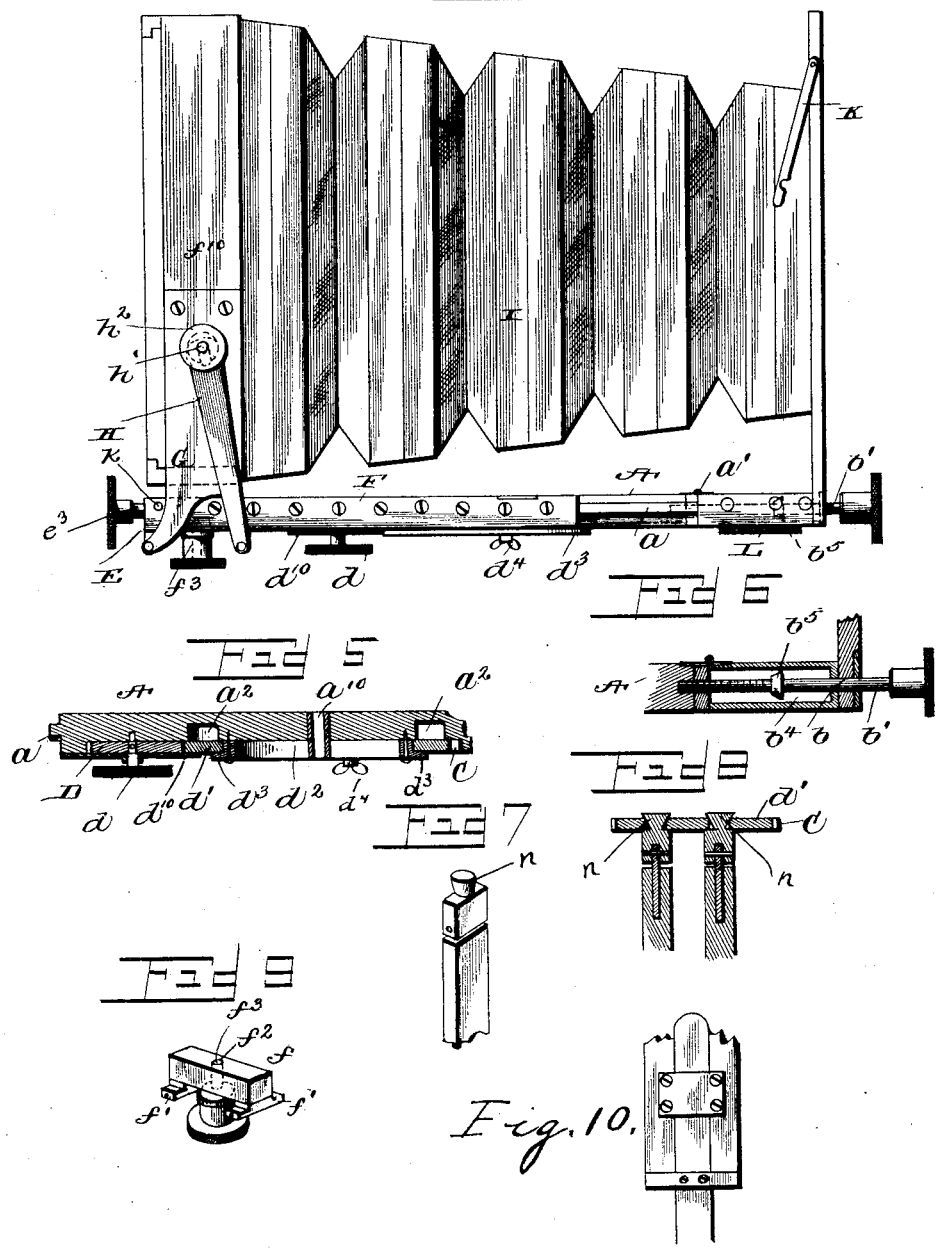
Witnesses
John Imirie
M. C. Ball
Inventor
William Scorer
By his Attorneys
Richards & Geo.

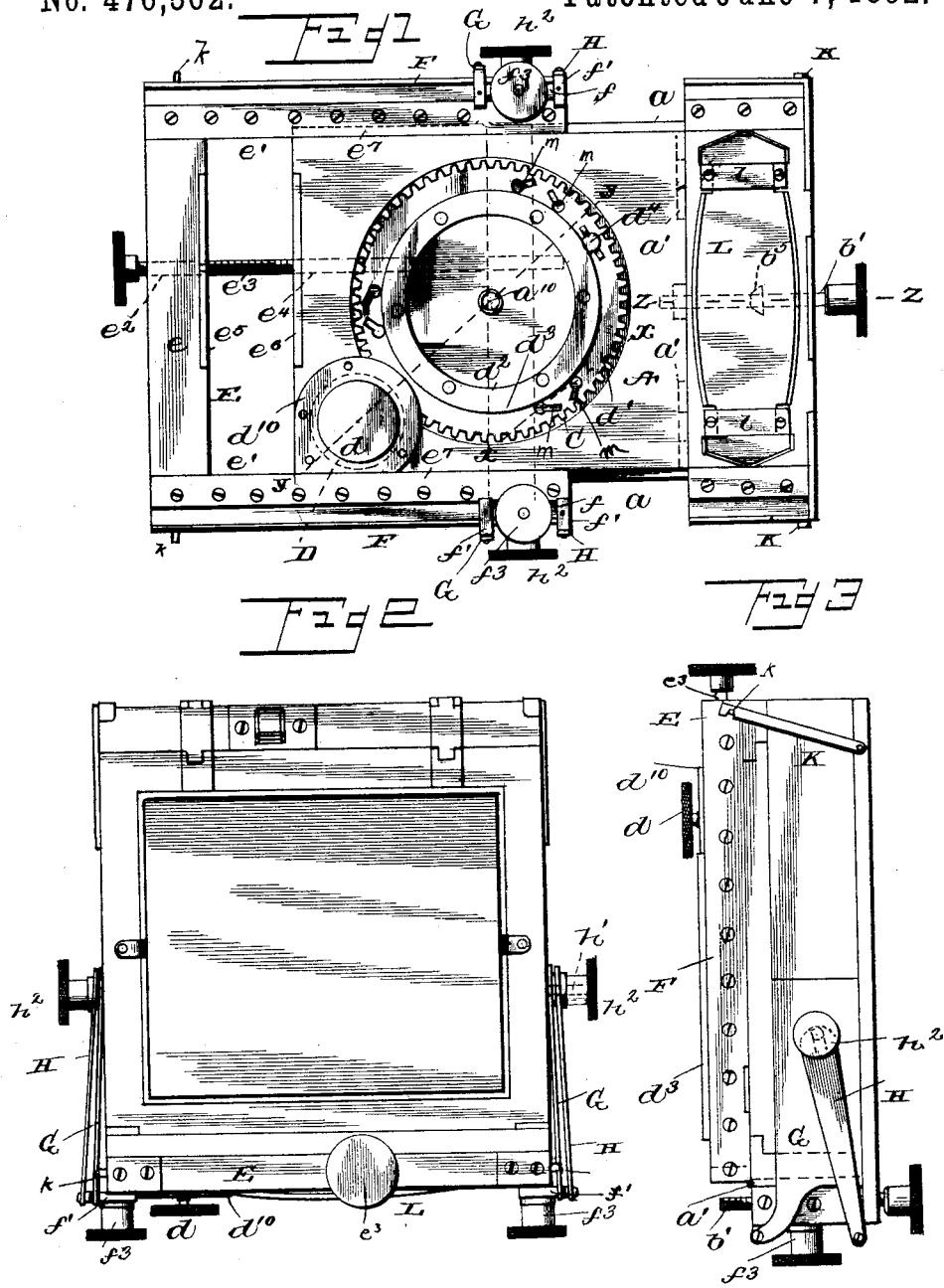

UNITED STATES PATENT OFFICE.

WILLIAM SCORER, OF HAVANT, ENGLAND.

PHOTOGRAPHIC CAMERA.

SPECIFICATION forming part of Letters Patent No. 476,562, dated June 7, 1892.

Application filed July 22, 1889. Serial No. 318,343. (No model.) Patented in England August 31, 1888, No. 12,573.

*To all whom it may concern:*

Be it known that I, WILLIAM SCORER, watchmaker and jeweler, a subject of the Queen of Great Britain, residing at North Street, Havant, in the county of Hampshire, England, have invented certain Improvements in the Construction of Photographic Cameras, (for which I have obtained Letters Patent in Great Britain, dated August 31, 1888, No. 12,573,) of which the following is a full, clear, and exact description.

My invention relates to improvements in the construction of photographic cameras; and it consists of an arrangement of parts for the easy closing and folding of the whole camera into a small, compact, and portable apparatus, the focusing-glass being protected by the base of the camera when closed, the base consisting of the parts arranged in the manner hereinafter described and of a rotating disk or turn-table fixed thereto.

In the drawings forming a part of the specification, Figure 1 is a bottom view. Fig. 2 is a rear view. Fig. 3 is a side view showing the camera closed. Fig. 4 is a similar view, the camera being extended. Fig. 5 is a detail cross-section of the line $y\ y$, Fig. 1. Fig. 6 is a cross-section on the line $z\ z$, Fig. 1. Figs. 7 and 8 are detail views of the tripod, Fig. 8 being on the line $x\ x$, Fig. 1. Fig. 9 is a detail perspective view of the sliding block. Fig. 10 is a detail view of the tripod.

A indicates the base of my improved camera, the same being provided on its sides with flanges $a$, the purpose of which will appear hereinafter. The front of the camera is hinged to the base A by means of the hinges $a'$, as will be seen by reference to the drawings. The lower part of the front board of the camera is provided with a perforation $b$, through which a screw $b'$ is passed, the same entering a screw-threaded hole or socket in the front portion of the base A. The screw $b'$ plays in a slot $b^4$ in the lower portion of the front of the camera and is held therein by a collar $b^5$. When the base A has been lowered, this screw enters the screw-threaded hole in the forward end of base A and holds the front of the camera to the base A.

On the under side of the base A, I provide means for turning the camera, and I will now proceed to describe the same. An annular groove $a^2$ is made in the bottom of the camera-base, directly over which is placed an annular plate $d'$, the periphery of which is provided with teeth C, the same meshing with the teeth of a small pinion D, seated in a recess in the bottom of the base A and retained therein by a plate $d^{10}$. The shaft of the pinion D has on its lower end a milled head for the purpose of manipulating the camera.

To retain the annular plate in place, I provide a second annular plate $d^2$, the said plate $d^2$ having a flange $d^3$ on its outer edge. It will be seen that by turning the milled head the camera can be adjusted at any angle. The ends of the tripod are cone-shaped, as shown at $n\ n$, Figs. 7 and 8. The slots $m$ are adapted to receive the cone-shaped ends of the tripod, which first enter the enlarged portion of said slot and then slide into the slot, and are thus held tightly in place. A thumb-screw $d^4$ works in a perforation in the plate $d^2$ to retain the camera in any one position desired.

I provide what I shall term an "auxiliary base" E, the same consisting of a cross-piece $e$ and two side pieces $e'$. In the cross-piece I provide a perforation $e^2$, through which passes a screw $e^3$, the same entering a screw-threaded perforation $e^4$ in the base A, the screw passing through plates $e^5$ and $e^6$. The two side pieces $e'$ are provided with plates $e^7$ for the purpose of forming a guideway for the flanges $a$. On the other side of the side pieces $e'$ are ways F, in which slide blocks $f$, provided with T-heads at each end. In each block I provide a screw-hole $f^2$, through which passes a set-screw $f^3$. (See Fig. 9.) To the rear head $f'$ I secure the reduced end of plate G, the upper portion of which is secured to the side pieces $f^{10}$ of the camera. The front head $f$ has secured to it the lower end of a plate H, the upper end of which is provided with a slot to allow play when adjusting the camera. Through said slot passes a pin $h'$, formed on the plate G. The pin $h'$ is screw-threaded at its outer end and is provided with a set-nut $h^2$. It will be seen that when it is desired to adjust the camera it is only necessary to manipulate the screw $f^3$, the upper end of which will bear against the upper wall of the way F, which in turn will drawn down on parts $f$, G, and H, and thereby secure the camera in position for operation.

The bellows I is of the usual form, one end being connected to the front board and the other to a frame $f^{10}$, in which slide the usual ground-glass and plate holders. To the front board is pivoted a latch K, the end of which engages a pin $k$ on the way F, the object of which is to lock the camera when in closed position. To the under side of the front portion of the base I secure a handle L by means of plates $l$.

If desired, I may use the common form of tripod. In such instance I provide an opening $a^{10}$ in the base A for a set-screw, whereby the tripod may be secured.

The operation of my camera will be readily understood by those skilled in the art to which it appertains. If the camera be closed and the operator desires to use the same, it is only necessary to disengage the latch, let down the base, adjust set-screw $e^3$, and then draw the bellows back the desired distance and secure the same to ways F, as before described.

What I claim is—

1. In a photograph-camera, the combination, with the front sliding base A and the annular plate $d'$, having teeth C, of pinion D, adapted to engage said teeth C for actuating said plate $d'$ and the screw $b'$ for securing the front to said base, substantially as set forth.

2. In a photograph-camera, the combination, with the auxiliary base E, consisting of the cross-piece $e$ and side pieces $e'$, of plates $e^7$, secured to pieces $e'$, adapted to receive flanges $a$ on the base A, ways F on said side pieces $e'$, blocks $f$, having T-heads $f'$, and set-screws $h^2$, plates G and H, secured to sliding block $f$, and screw-threaded pins $h'$ on said plates G, substantially as set forth.

3. In a photograph-camera, the combination, with the sliding base A, the front of said camera hinged to said base, of auxiliary base E, consisting of cross-pieces $e$ and side pieces $e'$, plates $e^7$ and ways F on said side pieces, T-headed blocks $f'$, having set-screws $h^2$, adapted to slide on ways F, and plates G and H, engaging the blocks $f$, substantially as set forth.

4. In a camera, the combination, with the base A and auxiliary base E, said base A adapted to move in said auxiliary base, of annular plate $d'$, having teeth C, pinion D, adapted to engage said teeth C for actuating said plate $d'$, and screw $e^3$, adapted to move said base A, substantially as set forth.

WILLIAM SCORER.

Witnesses:
 HARRY FAY,
  *West St., Havant.*
 ALFRED H. RIVERS,
  *North Street, Havant, England.*